(12) United States Patent
Kim et al.

(10) Patent No.: US 9,021,139 B1
(45) Date of Patent: Apr. 28, 2015

(54) IOT DEVICE ENVIRONMENT DETECTION, IDENTIFICATION AND CACHING

(71) Applicant: Belkin International, Inc., Playa Vista, CA (US)

(72) Inventors: Ryan Yong Kim, Rolling Hills Estates, CA (US); Venkata Subba Rao Pathuri, Alpharetta, GA (US)

(73) Assignee: Belkin International Inc., Playa Vista, CA (US)

( * ) Notice: Subject to any disclaimer, the term of this patent is extended or adjusted under 35 U.S.C. 154(b) by 0 days.

(21) Appl. No.: 14/290,073

(22) Filed: May 29, 2014

Related U.S. Application Data

(63) Continuation of application No. 14/242,765, filed on Apr. 1, 2014.

(51) Int. Cl.
| | |
|---|---|
| *G06F 15/16* | (2006.01) |
| *H04W 12/06* | (2009.01) |
| *H04L 12/26* | (2006.01) |
| *G06F 12/00* | (2006.01) |

(52) U.S. Cl.
CPC ............. *H04W 12/06* (2013.01); *H04L 43/065* (2013.01)

(58) Field of Classification Search
CPC ..... H04L 12/2807; H04L 41/20; H04L 41/26; H04L 43/0811; H04L 41/0233; H04L 41/046; H04L 41/0853; H04L 41/0893; H04L 41/22; H04L 12/66; H04L 41/0253; H04L 41/0273; H04L 51/32

USPC .................. 709/203, 217–219, 223–229, 250
See application file for complete search history.

(56) References Cited

U.S. PATENT DOCUMENTS

| | | | | |
|---|---|---|---|---|
| 7,886,033 | B2 * | 2/2011 | Hopmann et al. | 709/223 |
| 8,316,438 | B1 * | 11/2012 | Bush et al. | 726/22 |
| 2012/0290694 | A9 * | 11/2012 | Marl et al. | 709/223 |
| 2014/0244768 | A1 * | 8/2014 | Shuman et al. | 709/206 |

\* cited by examiner

*Primary Examiner* — Zarni Maung
(74) *Attorney, Agent, or Firm* — Kilpatrick Townsend & Stockton LLP

(57) ABSTRACT

A method and apparatus for controlling latency within a wireless system, and more specifically sharing, updating and storing status information between devices in a wireless network, is disclosed. An example method includes receiving, at a computing device, a communication including an indication that a mobile device is associated with a device on a network; transmitting stored status data, wherein the stored status data includes a status corresponding to the device, and wherein when the stored status data is received, the stored status data is used to display the status corresponding to the device; detecting updated status data corresponding to the device; updating the stored status data corresponding to the device using the updated status data corresponding to the device; and transmitting the updated status data, wherein the updated status data includes the updated status corresponding to the device, and wherein when the updated status data is received, the updated status data is used to display the updated status corresponding to the device.

30 Claims, 14 Drawing Sheets

IOT DEVICE ENVIRONMENT DETECTION, IDENTIFICATION AND CACHING

CROSS-REFERENCE TO RELATED APPLICATIONS

This application is a continuation of U.S. application Ser. No. 14/242,765, filed Apr. 1, 2014, which is hereby incorporated by reference in its entirety.

FIELD

The present disclosure relates to controlling latency within a wireless system. Specifically, various techniques and systems are provided for sharing, updating and storing status information between devices in a wireless network.

BRIEF SUMMARY

The present disclosure relates to controlling latency within a wireless system. Specifically, various techniques and systems are provided for sharing, updating and storing status information between devices in a wireless network.

One exemplary embodiment according to the present invention includes a computer-implemented method, comprising: receiving, at a computing device, a communication including an indication that a mobile device is associated with a device on a network; transmitting stored status data, wherein the stored status data includes a status corresponding to the device, and wherein when the stored status data is received, the stored status data is used to display the status corresponding to the device; detecting updated status data corresponding to the device; updating the stored status data corresponding to the device using the updated status data corresponding to the device; and transmitting the updated status data, wherein the updated status data includes the updated status corresponding to the device, and wherein when the updated status data is received, the updated status data is used to display the updated status corresponding to the device.

Another exemplary embodiment according to the present invention includes a computing device, comprising: one or more processors; and a memory having instructions stored thereon, which when executed by the one or more data processors, cause the computing device to perform operations. The operations may include: receiving, at a computing device, a communication including an indication that a mobile device is associated with a device on a network; transmitting stored status data, wherein the stored status data includes a status corresponding to the device, and wherein when the stored status data is received, the stored status data is used to display the status corresponding to the device; detecting updated status data corresponding to the device; updating the stored status data corresponding to the device using the updated status data corresponding to the device; and transmitting the updated status data, wherein the updated status data includes the updated status corresponding to the device, and wherein when the updated status data is received, the updated status data is used to display the updated status corresponding to the device.

Another exemplary embodiment according to the present invention includes a non-transitory computer-readable storage medium having instructions stored thereon, which when executed by a computing device, cause the computing device to: receive, at a computing device, a communication including an indication that a mobile device is associated with a device on a network; transmit stored status data, wherein the stored status data includes a status corresponding to the device, and wherein when the stored status data is received, the stored status data is used to display the status corresponding to the device; detect updated status data corresponding to the device; update the stored status data corresponding to the device using the updated status data corresponding to the device; and transmit the updated status data, wherein the updated status data includes the updated status corresponding to the device, and wherein when the updated status data is received, the updated status data is used to display the updated status corresponding to the device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
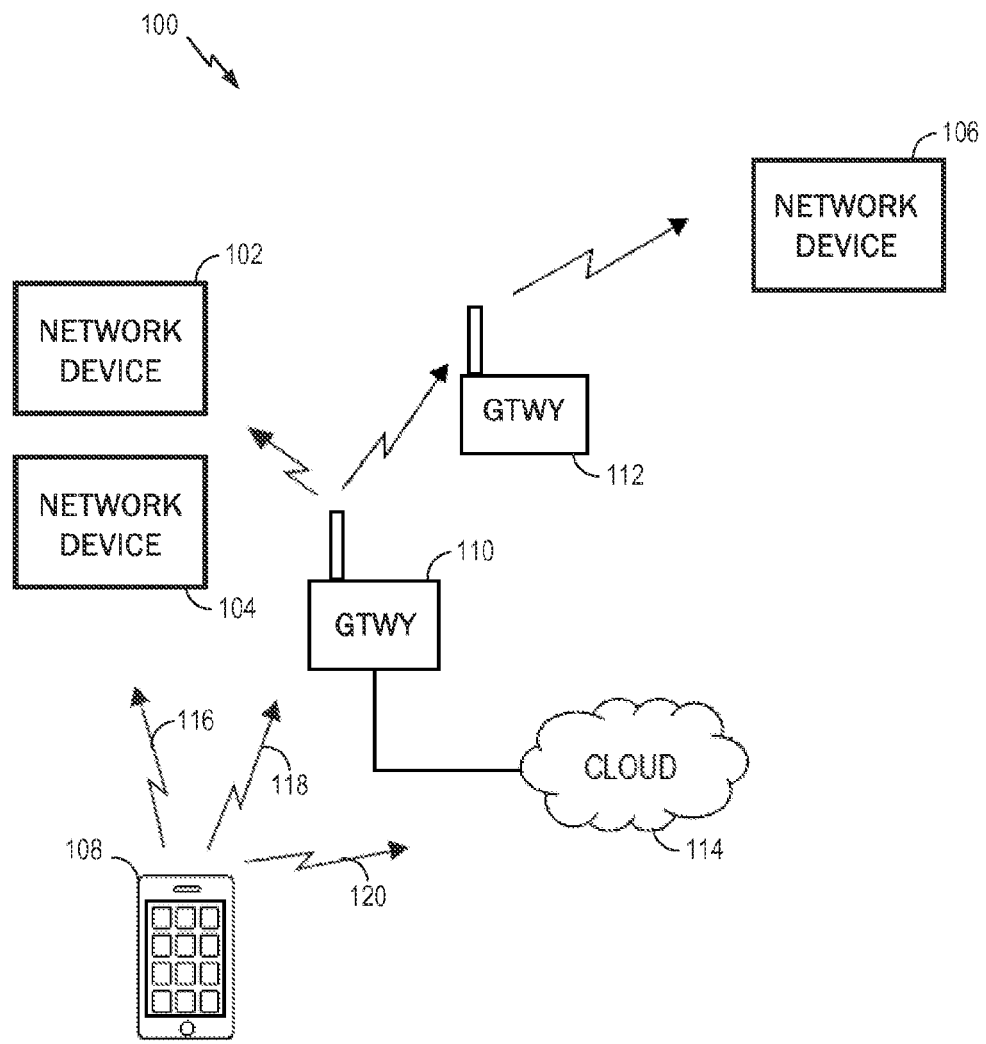
FIG. 1 is an illustration of an example of a wireless network environment in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A local area network may be set up to provide a user with access to various devices within the network. For example, a home automation network may include one or more network devices that provide a user with the ability to remotely configure or control one or more appliances within the user's home. The local area network may include one or more gateways that provide the user with access to the network devices. The one or more gateways may also provide the user and the network devices with access to one or more external networks, such as a cloud network, the Internet, and/or other wide area networks.

It is desirable for a user to be able to access the network devices (e.g., using a mobile device) while located within the local area network and also while located remotely from the local area network. As explained herein, a local area network may include multiple logical networks. In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, the mobile device may be authenticated based on the mobile device's authentication with the logical network. For example, if the mobile device has authorized access to the logical network (e.g., a WiFi network provided by a gateway), the network devices paired with that logical network may allow the mobile device to connect to them without requiring a login. Accordingly, only users of mobile devices that have authorization to access the logical network are authorized to access network devices within the logical network, and these users are authorized without having to provide login credentials for the network devices.

While remote, the user may access the network devices using an external network, such as a cloud network and/or the Internet. An accountless authentication process may also be performed when the user is remote so that the user can access network devices within the logical network without having to enter network device login credentials. For example, a cloud network server may provide a network ID and/or one or more keys to a network device and to a mobile device (e.g., running an application, program, or the like). In some cases, a unique key may be generated for the network device and a separate unique key may be generated for the mobile device. The keys may be specifically encrypted with unique information identifiable only to the network device and the mobile device. The network device and the mobile device may be authenticated using the network ID and/or each device's corresponding key each time the network device or mobile device attempts to access the cloud network server.

In one example, a home wireless local area network may include a single gateway, such as a router. A network device within the local area network may pair with or connect to the gateway and may obtain credentials from the gateway. For example, when the network device is powered on, a list of gateways that are detected by the network device may be displayed on a mobile device (e.g., via an application, program, or the like installed on and executed by the mobile device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The mobile device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send information relating to the network device (e.g., MAC address, serial number, or the like) and/or information relating to the mobile device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the mobile device. The server may associate the network device and the mobile device with the logical network by storing the network ID and the set of security keys in a record or profile. The cloud network server may then transmit the network ID and the set of security keys to the network device. The network device may store the network ID and its unique security key. The network device may also send the network ID and the mobile device's unique security key to the mobile device. The network device and the mobile device may then communicate with the cloud server using the network ID and the unique key generated for each device. Accordingly, the user may remotely access the network device via the cloud network without logging in each time access is requested. Also, the network device can exchange communications with the server regarding the logical network.

In some embodiments, a local area network may include multiple gateways (e.g., a router and a range extender) and multiple network devices. For example, a local area network may include a first gateway paired with a first network device, and a second gateway paired with a second network device. A server (e.g., a cloud network server) may register the first gateway as a first logical network with a first network ID and may generate a first set of security keys for the first network device and a mobile device. The first set of security keys may include a unique security key for the first network device and a unique security key for the mobile device for use in accessing the first network device on the first logical network. The server may register the second gateway as a second logical network due to differences in the credentials between the first gateway and second gateway. The server may assign the second gateway a second network ID and may generate a second set of security keys. For example, the server may generate a unique security key for the second network device and may generate a unique security key for the mobile device for use in accessing the second network device on the second logical network. The server may associate the first network device and the mobile device with the first logical network by storing the first network ID and the first set of security keys in a first record or profile. The server may also associate the second network device and the mobile device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the mobile device's unique security key to the mobile device. The network devices and the mobile device may then communicate with the cloud server using the respective network ID and the unique key generated for each device. Accordingly, when multiple gateways are included in the home local area network, multiple logical networks (associated with different network identifiers) may be present within the local area network.

When the mobile device is located within range of the local area network (for example, one or all of its gateways), the mobile device may easily access network devices associated with both logical networks due to the ability of the mobile device to perform local discovery techniques (e.g., universal plug and play (UPnP)). In that situation, the mobile device may most efficiently transmit information with other devices using this most direct method. On the other hand, when the user is located remotely from the local area network, the mobile device may need to access those network devices via an external network, e.g. a cloud network, the Internet, and/or other wide area networks. Therefore, when the mobile device moves from being remote to being within range of the local area network, the mobile device may remain connected to the network devices within the local area network through the external network it previously connected to. Remaining connected to devices, which are within the local area network, via an external network may cause latency, inaccuracy and/or other inefficiencies. However, the mobile device may have several options available to connect to those network devices, some of which may be more direct and more efficient. When a mobile device is remote and has connected to the network devices via an external network, such inefficiencies (e.g. latency) also exist and may even increase. Furthermore, it may be beneficial for the mobile device to maximize its transmissions with the external network (e.g. cloud network) to reduce latency caused by communication between the external network and the local area network. Accordingly, techniques and systems are described herein for a mobile device or other network device to analyze its environment to detect and identify other devices in its network to communicate with via its most efficient available process and path.

FIG. 1 illustrates an example of a wireless local area network 100. The local area network 100 includes network device 102, network device 104, and network device 106. In some embodiments, the network devices 102, 104, 106 may include home automation network devices that allow a user to access, control, and/or configure various home appliances located within the user's home, such as a television, radio, light, microwave, iron, and/or the like. For example, network device 102 may include a home automation switch that may be coupled with a home appliance.

A user may wirelessly communicate with the network devices 102, 104, 106 using mobile device 108. The mobile device 108 may include a cellular telephone, a smartphone, a laptop computer, a tablet, a personal digital assistant (PDA), a computing device, wearable devices (e.g., a smart watch, or the like), or any other mobile device having wireless connection capability. While only a single mobile device 108 is shown in FIG. 1, one of ordinary skill in the art will appreciate that multiple mobile devices may connect with the network devices 102, 104, 106. The user may interact with the network devices 102, 104, or 106 using an application, a web browser, a proprietary program, or any other program executed and operated by the mobile device 108. In some embodiments, the mobile device 108 may communicate directly with the network devices 102, 104, 106 (e.g., communication signal 116). In some embodiments, the mobile device 108 may communicate with the network devices 102, 104, 106 via the gateways 110, 112 (e.g., communication signal 118) and/or the cloud network 114 (e.g., communication signal 120).

The local area network 100 further includes gateway 110 and gateway 112. Gateway 110 or 112 can be utilized for communicating with network devices 102, 104, 106 or mobile device 108 via radio signals in order to provide communication, location, and/or other services to the devices. While two gateways 110 and 112 are shown in FIG. 1, one of ordinary skill in the art will appreciate that any number of gateways may be present within the local area network 100. The wireless network provided by gateway 110 and gateway 112 may be any type of network familiar to those skilled in the art that can support data communications using any of a variety of commercially-available protocols. For example, gateways 110, 112 may provide wireless communication capabilities for the wireless local area network 100 using particular communications protocols, such as WiFi (e.g., IEEE 802.11 family standards, or other mobile communication technologies, or any combination thereof). Using the communications protocol(s), the gateways 110, 112 may transmit and receive radio frequencies with which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides wireless network access among one or more computing devices and/or external networks. For example, gateway 110 may include a router and gateway 112 may include a range extender.

The gateways 110 and 112 may also provide the mobile device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application. In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106, and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the mobile device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
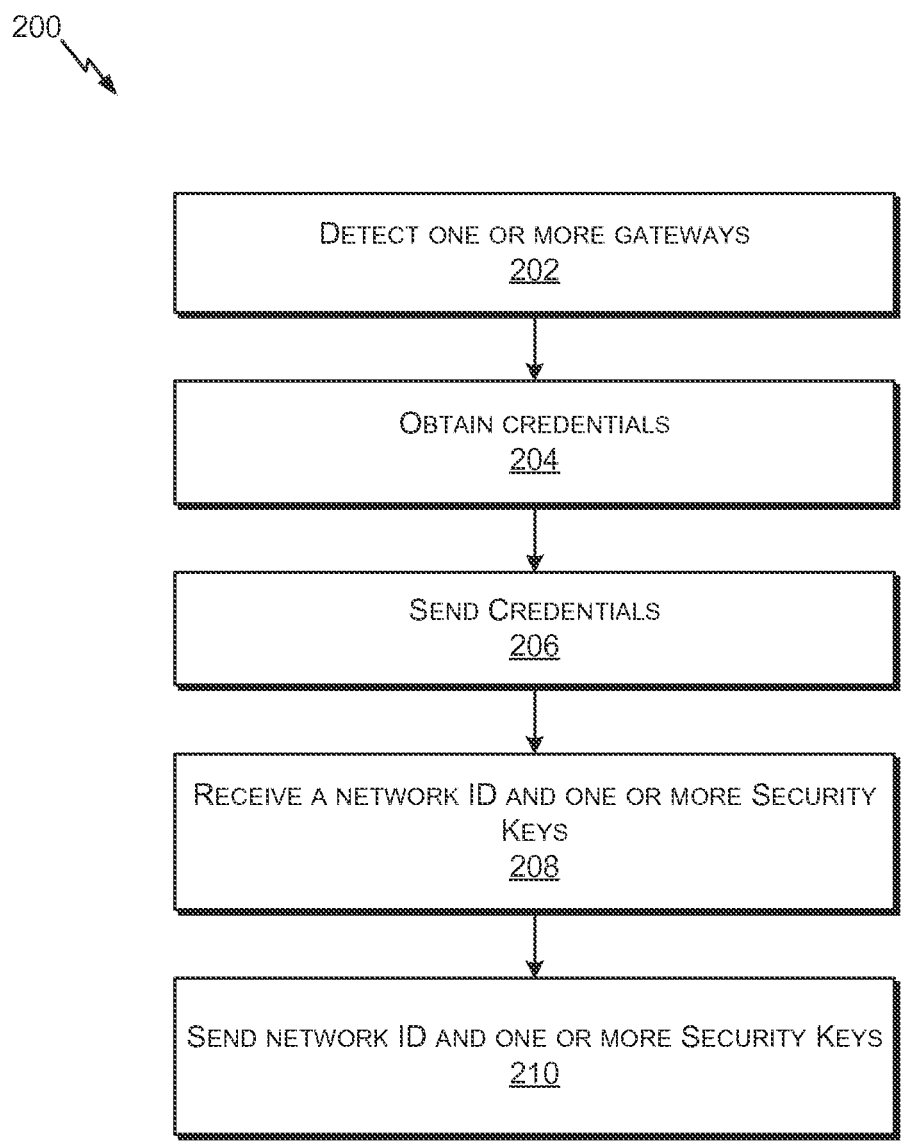
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset. During the provisioning process, the mobile device may directly communicate with the network device. In some embodiments, direct communication between network devices 102, 104, 106 and mobile device 108 may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and mobile device with a server, such as a server located within the cloud network 114. For example, upon being powered on or reset to factory settings, the network device may send or broadcast identification information to a mobile device. The identification information may be sent during a discovery process. For example, the identification information may be sent in response to a discovery request from the mobile device 108. In some cases, the identification information may include a name of the network device.

An application, program, or the like that is installed on and executed by the mobile device may receive the identification information from the network device. When the application on the mobile device is launched by a user, the mobile device may display the identification information for selection by the user. Once the network device identification information is selected, the network device may send to the mobile device a list of gateways that are detected by the network device. The mobile device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The mobile device may then prompt the user to enter login information that is required for accessing the network signals provided by the gateway. For example, the login information may be the same information that was originally set up to access the gateway network signals (e.g., when the gateway was initially installed). The mobile device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the mobile device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the wireless local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which they are paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, or the like) and/or information relating to the mobile device (e.g., MAC address, serial number, application unique identifier, or the like) to the server. In some embodiments, the communication of the credentials from the network device to the cloud network server may be a Hypertext Transfer Protocol (HTTP), a Hypertext Transfer Protocol Secure (HTTPS) communication, a secure Transmission Control Protocol (TCP) communication, or the like. One of ordinary skill in the art will appreciate that other communication mechanisms may be used to communicate between the network device and the cloud network server.

Once the credentials are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the mobile device. For example, the server may generate a unique key for the network device 102 and a separate unique key for the mobile device 108.

In some embodiments, as previously described, network device 104 may also be paired with gateway 110 at the same or a later point in time as the network device 102. During registration of the network device 104, the server may determine that the mobile device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the mobile device 108 when registering the gateway 110 as the first logical network.

The gateway 112 may also be registered by the server as a second logical network with a second network ID. A second set of security keys may be generated for the network device 106 and the mobile device 108. For example, the server may generate a unique security key for the network device 106 and a unique security key for the mobile device 108 as it relates to the second logical network. On the other hand, the server may retrieve a unique key that was previously generated for the mobile device 108 when registering the gateway 110 as the first logical network if it detected that one exists. In such an embodiment where only one mobile device security key is granted, a logical network ID may be generated for each logical network, and the single mobile device security key may be associated with the network devices within each logical network via the cloud. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the mobile device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for a mobile device.

At step 208, the network device may receive the network ID and the set of security keys. For example, once the server has generated a record or profile associating the network device 102 with the first logical network, the server may transmit the first network ID and the first set of security keys to the network device 102. For example, the server may transmit this information securely using any standard secure transmission standard (e.g. HTTPS). The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the mobile device 108 when registering the first logical network. The network device 104 may then receive and store the first network ID and the security keys from the server.

At 210, the network device may send the network ID and the set of security keys to the mobile device. For example, the network device 102 may send to the mobile device 108 the first network ID and the unique security key generated for the mobile device 108. The network device 102 and the mobile device 108 may then communicate with the cloud network server using the first network ID and each device's unique key. In some embodiments, the network device and the mobile device may generate a signature using their respective security key. The signature is sent to the cloud network server along with a communication from the network device or mobile device. The cloud network server may then process the signature in order to authenticate each device, as described below. The network device and mobile device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed, for example, as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

For example, the network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication. This is one exemplary process for validating the authenticity of such a communication. However, various other processes are possible.

A mobile device may also generate a signature using its uniquely generated security key. For example, the mobile device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of mobile device that is used and the type of values that may be accessed and/or generated by the type of mobile device. In some cases, one type of mobile device may not allow an application to access a unique identifier of the mobile device (e.g., a serial number, UUID, or the like). In such cases, the SDU UniqueId value may include a value generated by an application or program installed on and executed on the mobile device that is used to access the network device. The value may be unique to the application or program that generated the value. In other cases, another type of mobile device may allow an application to access a unique identifier of the mobile device. In such cases, the SDU UniqueId value may include a value that is unique to the mobile device itself, such as a serial number, UUID, or the like. In this example, the mobile device may retrieve the unique value from storage within the mobile device. One of ordinary skill in the art will appreciate that other unique identifiers may be used to uniquely identify the mobile device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the mobile device with regard to a particular logical network. The StringToSign input may be expressed as StringToSign=UniqueId+"\n"+"\n"+ ExpirationTime. The StringToSign value is different from the StringToSign value generated by network device in that no serial number is included. Accordingly, the StringToSign input is generated by appending an expiration time to the mobile device's unique identifier. The ExpirationTime term may indicate the period of time for which the signature is valid, similar to that above for the signature generated by the network device.

The mobile device may place the signature in a data packet and may transmit the data packet to the cloud network server with a communication signal. The network device may also place the network ID in the data packet. The signature and the network ID, if included, may be used by the cloud network server to verify that the mobile device is associated with the logical network and authorized to communicate with one or more network devices associated with the logical network. In some embodiments, a signature is provided with each communication sent from the mobile device to the server. The cloud server may receive the signature and may generate a signature using the same expression as that used by the mobile device. For example, the server may retrieve the mobile device's key and other relevant information from storage and generate the signature using the key and the other information using the expression described above. The server then verifies whether the signatures match. Upon determining that the signatures match, the server authenticates the mobile device and allows it to communicate with one or more of the network devices associated with logical network.

Once the provisioning process is completed, the mobile device 108 may access the network device 102 locally via the gateway 110 (e.g., communication signal 118) or remotely via the cloud network 114 (e.g., communication signal 120). In some embodiments, the communication between the mobile device 108 and the cloud network 114 may be a HTTP or HTTPS communication. One of ordinary skill in the art will appreciate that other communication mechanisms may be used to communicate between the mobile device 108 and the cloud network 114.

As previously described, the mobile device, when located within range of the local area network, may be authenticated using accountless authentication that is based on the mobile device's authentication with the logical network. For example, if the mobile device has authorized access to the logical network (e.g., a WiFi network provided by a gateway), the network devices paired with that logical network may allow the mobile device to connect with them without requiring a network device login. Accordingly, the network device may perform accountless authentication of mobile devices that have authorization to access the logical network without requiring a user to provide login credentials for the network devices. While located remotely, the mobile device may also be authenticated to access the network devices via the cloud network using an accountless authentication process. For example, the network ID and the mobile device's unique security key may be used to allow the mobile device to communicate with the network devices via the cloud network (e.g., by generating a signature as described above).

When the mobile device 108 is located within range of both gateways 110, 112 in the local area network 100, the mobile device 108 does not encounter any issues when attempting to access any of the network devices 102, 104, 106. For example, the mobile device 108 may perform UPnP discovery and may list all if the network devices 102, 104, 106 that have responded to the discovery request regardless of which network ID the network devices 102, 104, 106 have. Accordingly, the existence of the first and second logical networks with first and second network IDs does not lead to any issues when the mobile device 108 is located within the local area network 100. However, when the user is located remotely, the mobile device 108 may only be associated with one logical network at a time. For example, the mobile device 108, while located remotely from the local area network 100, may query the cloud server with a known network ID (e.g., the first or second network ID). In response, the server will only return the network devices associated with that network ID. As a result, the user will not be able to see all network devices within the user's local area network 100.

Figure 3:
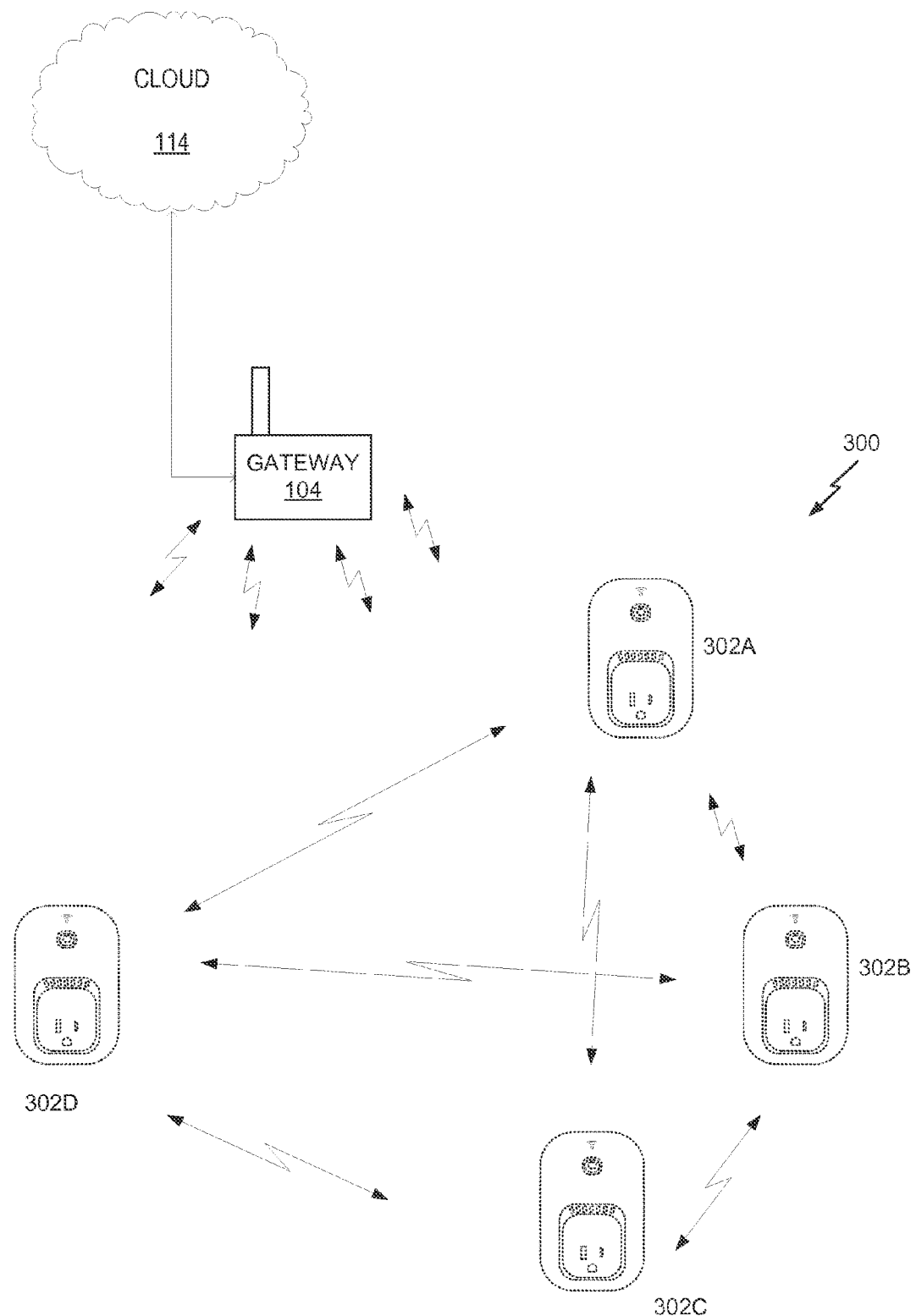
FIG. 3 is an example of a wireless local area network including a plurality of network devices, according to embodiments of the present invention.

FIG. 3 illustrates an example of a wireless local area network 300, according to embodiments of the present invention. The local area network 300 includes network device 302A, network device 302B, network device 302C and network device 302D. As noted, in some embodiments, the network devices 302A, 302B, 302C and 302D may include home automation network devices that allow a user to access, control, and/or configure various home appliances located within the user's home, such as a television, radio, light, microwave, iron, and/or the like, as described further with respect to FIG. 1. As such, network devices 302A, 302B, 302C and 302D may change status on a periodic basis. The "status" of a network device referred to herein may include, among other things, a state of the network device itself (e.g. on/off) or how the network device is situated within the network with respect to the other network and other devices throughout the network. For example, the status of a network device may refer to the network device's proximity to another network device and/or its ability to communicate with another network device because of the relative signal strength between the two network devices.

As described further with respect to FIGS. 1 and 2, upon being powered on or reset, the network devices 302A, 302B, 302C and 302D may be registered with the cloud network 114 and associated with a logical network within the local area network 300. Similarly, upon being powered/switched off or otherwise being disconnected from the network, the status of the network device 302 would be known and stored by the cloud network 114. For example, cloud network 114 may include storage (e.g. cache) that stores the status of the network devices within each local area network it is connected to and/or provides access to. More specifically, cloud network 114 may store a status table that includes the current status of each network device (as of its last communication with each network device). The cloud may store a single table with all statuses of each network device, or individual storage tables for each local area network or other subset of its devices/networks. In one embodiment, a change in status may prompt the network device to push its change in status to the cloud network 114 for storage or updating of the cloud's stored status table. In another embodiment, cloud network 114 may continuously (or periodically) communicate with each network device to check to see if its status has changed.

In some embodiments, a mobile device may, upon connecting to a local area network, check the status of the network devices on the network. In other embodiments, one network device may check the status of one or more of the other network devices on the network. A mobile or network device may seek to check the status of another network device or mobile device for various reasons, including to display such status(es) to a user on a display or otherwise, to check whether that device belongs to the same network, to synchronize or coordinate any scheduled executions, among others. For example, a device or user may desire to check various statuses on the device, such as power level, timestamped activity history (e.g. temperature for a thermostat, motion for a motion detector, etc.), how long it has been active/turned on, among many others. A device seeking to check the status of any other device on the network may communicate with the cloud network 114, to which all devices on the network are connected either directly or indirectly. Since the cloud network 114 stores an updated table/list of the statuses of each of the network devices within the requesting network's local area network, the cloud network 114 may communicate such status data to the network device. For example, if network device 302A and 302C were to each turn on and communicate their statuses to cloud network 114, cloud network 114 may analyze the status of network devices 302A and 302C and communicate to network devices 302A and 302C that they are each connected to the same local area network.

Figure 4:
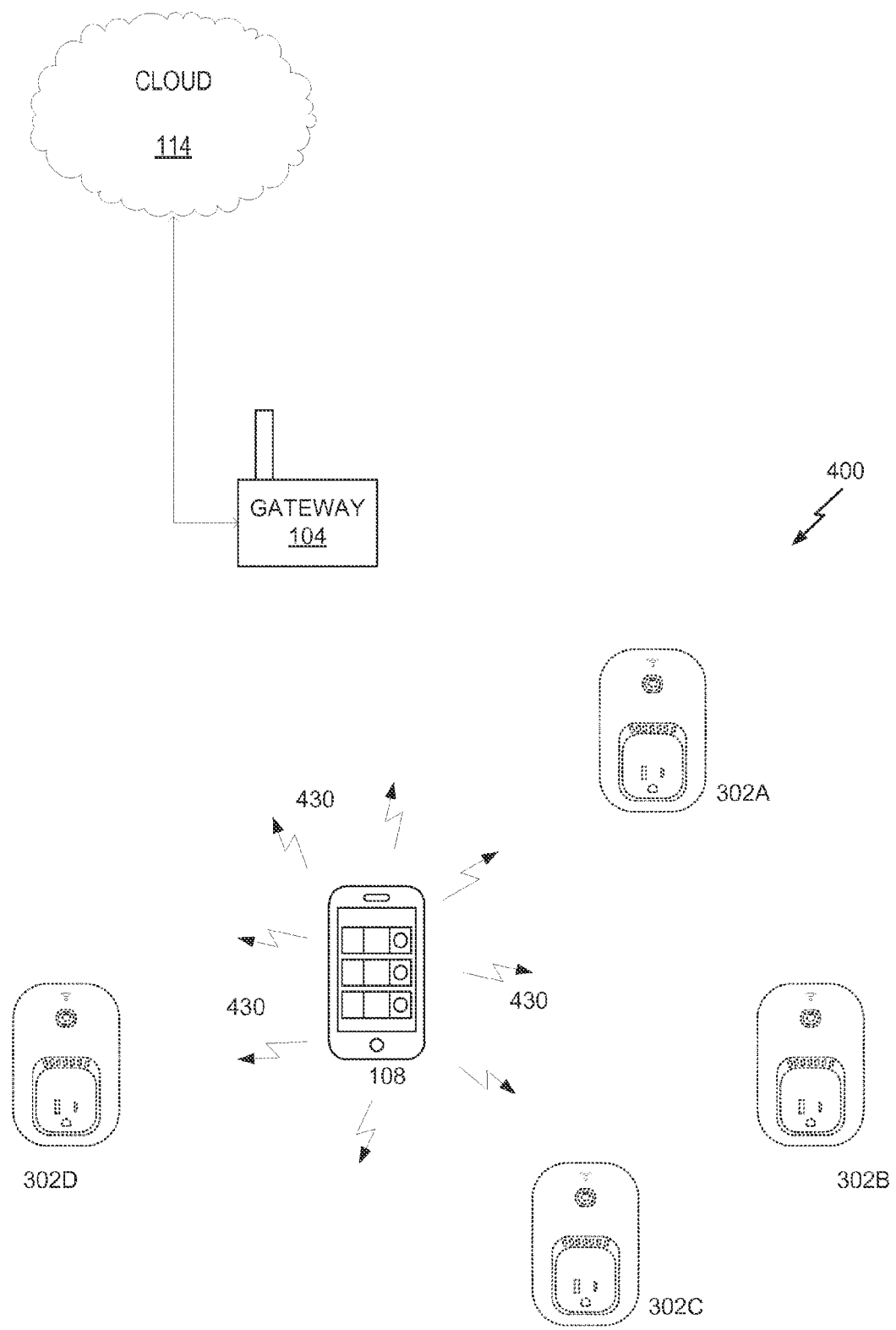
FIG. 4 is an example of a wireless local area network including a plurality of network devices and a mobile device, according to embodiments of the present invention.

FIG. 4 illustrates an example of a wireless local area network 400, according to embodiments of the present invention. Similar to local area network 300 in FIG. 3, the local area network 400 includes network device 302A, network device 302B, network device 302C and network device 302D. Local area network 400 also includes mobile device 108. In other words, local area network 400 is substantially similar to local area network 300 except that mobile device 108 has been turned on near local area network 400, to which it is associated, or has entered the an area to which local area network 400 can reach. When mobile device 108 enters local area network 400 as shown in FIG. 4, mobile device 108 may be authenticated based on the mobile device's authentication with the logical network or may otherwise commence communication with cloud network 114. Mobile device 108 may also communicate notification of its presence or other information directly to other network devices within local area network 400, as shown in FIG. 4 by communications 430. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, mobile device 108 may communicate to all other network devices in local area network 400, including network device 302A, network device 302B, network device 302C, and network device 302D, information/data regarding its status. Such status data may include the fact that it is present and turned on, or other status data/information. At any time that network devices 302A, 302B, 302C and 302D recognize that mobile device 108 is present at local area network 400, the network devices may communicate back to mobile device 108. For example, the network devices may send an acknowledgement (e.g. ACK signal) back to mobile device 108 to confirm that they received the status data sent by mobile device 108. The network devices may also send their own status data to mobile device 108.

While network devices 302 and mobile device 108 may each receive communication from other devices around local area network 400, including the status of each of those devices, network devices 302 and/or mobile device 108 may be continuously scanning local area network 400 (including, for example, running discovery algorithms) to determine whether any devices within the network have moved, turned on/off or otherwise added to or subtracted from the network, or have otherwise changed statuses.

Since network devices 302 and mobile device 108 may each receive communication from other devices around local area network 400, including the status of each of those devices, each device within local area network 400 may know the status of each other device in the network. For example, mobile device 108 or network devices 302 may not be required to communicate with cloud network 114 in order to obtain one or more of such statuses. Since cloud network 114 is an external network and may be remote from local area network 400, communication between devices within local area network 400 and cloud 114 may take more time than communication between two devices within local area network 400. For example, communication between devices within local area network 400 may take anywhere from 1 millisecond to 100 milliseconds, while communication between a device within local area network 400 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within local area network 400 may choose to send and receive/retrieve statuses directly with other devices within the network, as shown by communications 534 in FIG. 5, instead of communicating such information via cloud network 114. When a network device receives status data from another device on the device's local area network, it may store that status data so that it may retrieve and use that status data at a later time.

Figure 5:
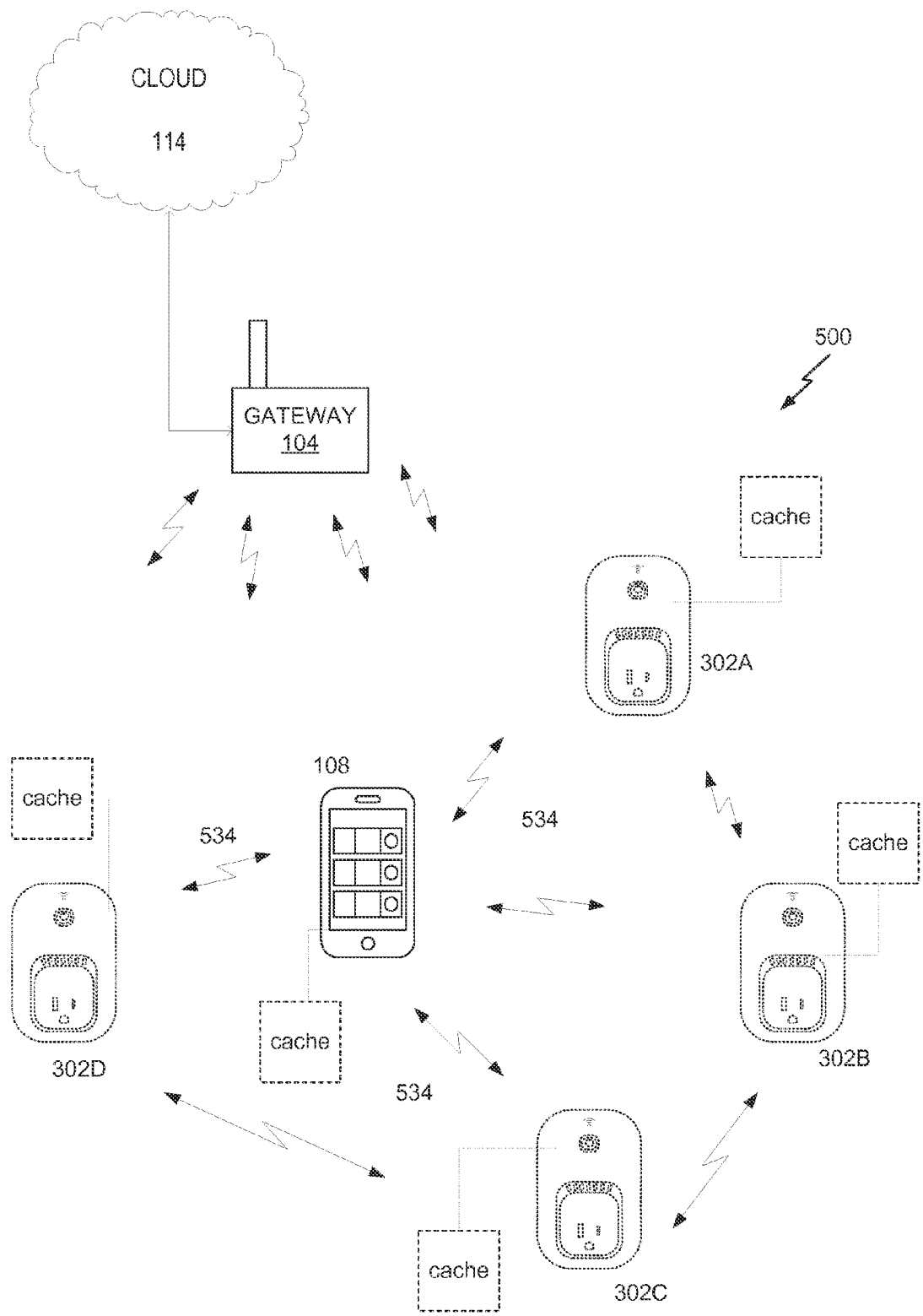
FIG. 5 is a is an example of a wireless local area network including a plurality of network devices and a mobile device, according to embodiments of the present invention.

FIG. 5 illustrates an example of a wireless local area network 500, according to embodiments of the present invention. Similar to local area network 400 in FIG. 4, the local area network 500 includes network device 302A, network device 302B, network device 302C, network device 302D, and mobile device 108. FIG. 5 also illustrates that each network device and mobile device may include a storage device, such as a cache, for storing data, including data regarding its own status and data regarding statuses received from the other devices within local area network 500. For example, mobile device 108 may, after being powered up, broadcast/send its status to network device 302D via communication 534. Network device 302D may store the status data received from mobile device 108 until the next time mobile device 108 updates its status by sending new/updated status data to network device 302D. Cache may be used for storage within network and/or mobile devices within the local area network 500 so that each of the devices may be able to quickly retrieve the data it needs from storage. Although a caching device may be used to store such data within the network and/or mobile devices within the local area network 500, other types of storage may be used.

Even though each network device may know and store the state of each other device within local area network 400, a device may not know when another device changes status (e.g. turns/powers off). However, network devices and/or mobile devices within local area network 500 may broadcast/send any updates in its status to other devices on the network. For example, if network device 302A changes status, it may send status data to the other network devices, such as network devices 302B, 302C and 302D and to mobile device 108. However, network device 302A may not know which network devices to update since the other network devices may change statuses periodically (e.g. turn off).

Therefore, a network or mobile device may subscribe to another network or mobile device within local area network 500. For example, network devices 302B, 302C and 302D and mobile device 108 may subscribe to status data notifications/updates from network device 302A. Such a subscription may be registered for upon initial connection with network device 302A when network device 302A first enters local area network 500 or at any other time after network device 302A has been associated with local area network 500. Subscriptions may be controlled to last indefinitely or may expire after a certain predetermined period of time after initial subscription. However, network devices may re-subscribe to another network device before or after their previous subscription has expired.

Subscriptions between network device and/or mobile devices may be registered similar to registering a device upon initial entrance into the local area network including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe.

Upon receiving a subscription from another network device or mobile phone, the network device being subscribed to may store a list of the network devices that subscribed to it. For example, network device 302A may store a list of network devices 302B, 302C and 302D and mobile device 108 after those devices subscribe to network device 302A. Then, when network device 302A undergoes a change in status, network device 302A may send that change in status to only the devices that had previously subscribed to it but where the subscription had not yet expired. Furthermore, according to some embodiments, the subscription list of a device may be automatically updated if that device receives notification that another device has left the range of the local area network, either from that device itself or from a different device. Therefore, the various devices within a given local area network, such as network 500, each contain continuously updated statuses of each other device on the network and obtain those statuses and updates through direct communication without necessary use of the cloud.

Figure 6:
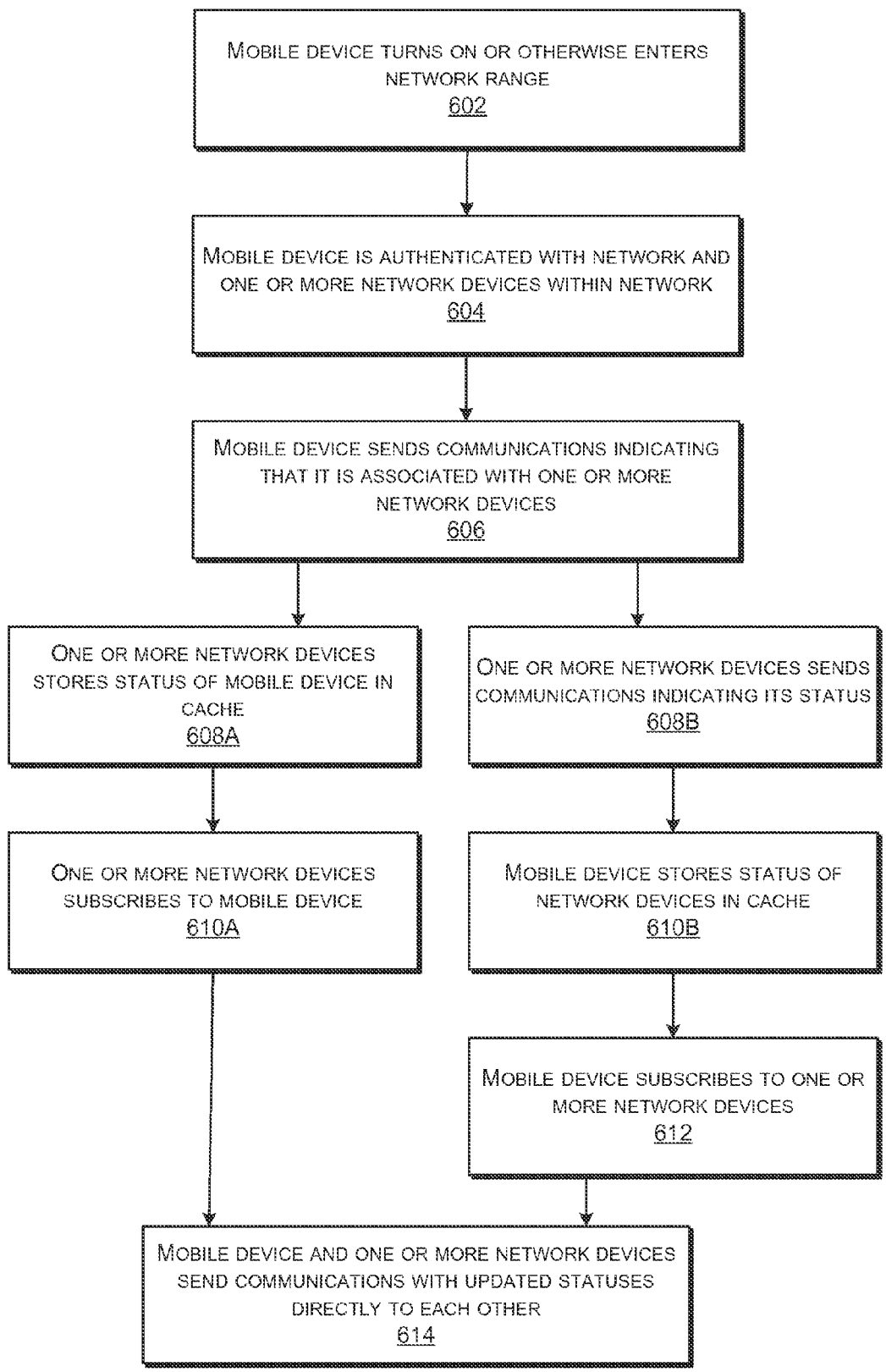
FIG. 6 is a flow chart showing an exemplary set of steps for a mobile device that turns on in range of a local area network, according to embodiments of the present invention.

FIG. 6 shows a flow chart showing an exemplary set of steps for a mobile device that turns on in range of a local area network, such as local area network 400 or 500, according to embodiments of the present invention. In step 602, a mobile device, such as mobile device 108 (or another network device such as network device 302A, 302B, 302C or 302D) in FIG. 5, turns on or otherwise enters the range of a network. In step 604, the mobile device is authenticated with the network and one or more network devices within the network. This step, or set of steps, is further described at length with respect to FIGS. 1 and 2 herein. For example, a user may create an account with login information that is used to authenticate the user and allow access to the network devices from the mobile device, or an accountless authentication system may be established between the network and mobile device. The system may generate a security key or set of security keys for authenticating the mobile device and any other network devices connected to the network, and may use such security keys for authenticating the mobile device to connect it with the network and network devices already on the network.

In step 606, the mobile device sends communications indicating that it is associated with one or more network devices, such as network devices 302A, 302B, 302C or 302D in FIG. 5. Such a communication may be similar to communication 430 as described with respect to FIG. 4. In other words, the mobile device may send a communication, including notification of its presence or other status data/information directly to other network devices within the local area network. In step 608A, the one or more devices to which the mobile device sent the information may receive the status data or other information and store it in cache or other storage within the network device(s). In step 610A, after receiving a notification from the mobile device that the mobile device is within its same local area network, the one or more network devices subscribes to the mobile device. After being subscribed to the mobile device, the mobile device may send notifications of any change in status to the mobile device to any device that has subscribed to it (but for a subscription that has not expired). As such, the one or more network devices that have subscribed to the mobile device may receive notifications of any change in status to the mobile device, and may thereafter update its status data stored in its cache. It would be understood that the mobile device and network device may reverse roles in this exemplary embodiment, such that a mobile device may subscribe to one or more network devices and receive notifications of any change in status to the one or more network devices, and may thereafter update its status data stored in its cache.

In step 608B, which may occur at substantially the same time as step 608A, the one or more network devices sends communications, which include an indication of its status, back to the mobile device. In step 610B, the mobile device to which the one or more network devices sent the information may receive the status data or other information and store it in cache or other storage within the network device(s). In step 612, after receiving a notification from the one or more network devices that the mobile device is within its same local area network, the mobile device subscribes to the one or more network devices. After being subscribed to the one or more network devices, the one or more one or more network devices may send notifications of any change in status of the one or more network devices to any device that has subscribed to it (but for a subscription that has not expired). As such, the mobile device that has subscribed to the one or more network devices may receive notifications of any change in status to the one or more network devices, and may thereafter update its status data stored in its cache.

After the one or more network devices and the mobile device have subscribed to each other, the one or more network devices and the mobile device may communicate with each other including send updates to each other regarding changes in status or any other data/information. It is also understood that more than one mobile device may be integrated into the process described in FIG. 6. Furthermore, the one or more network devices and the mobile device may switch roles within the process.

Figure 7A:
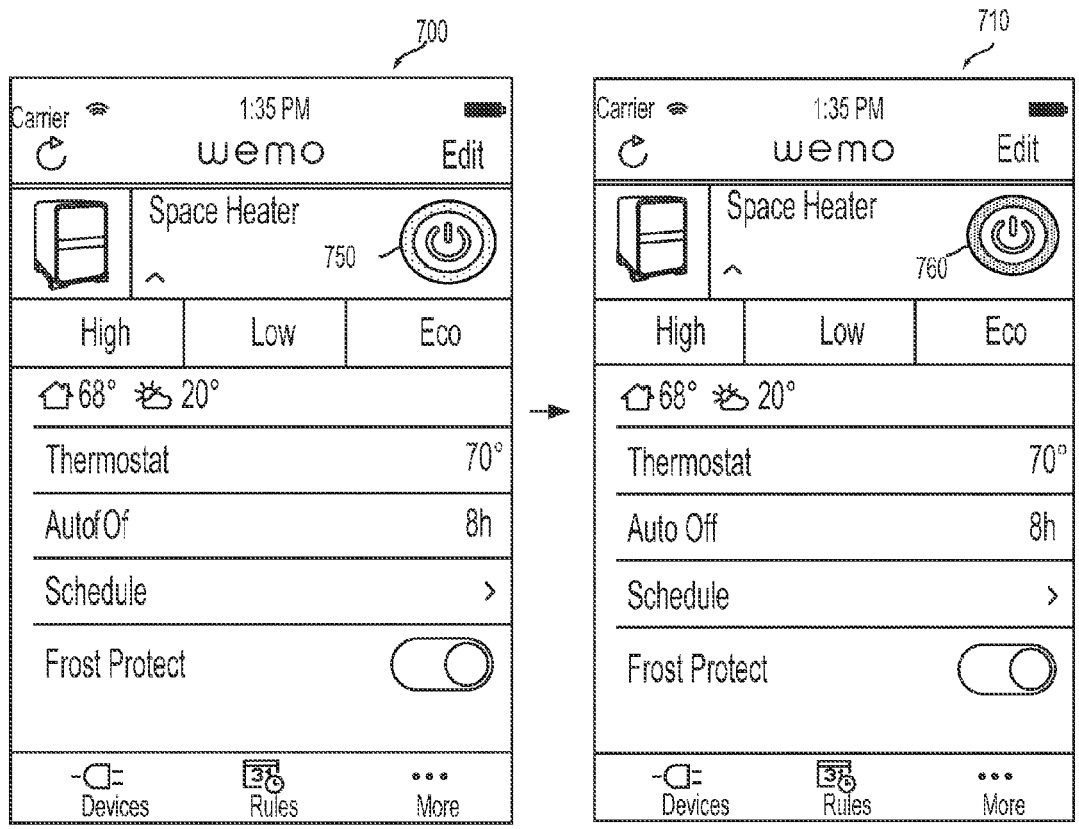
FIG. 7A is two screenshots of an application showing a transition from an exemplary display before a network device is turned on to the exemplary display after the network device is turned off, according to embodiments of the present invention.
Figure 7B:
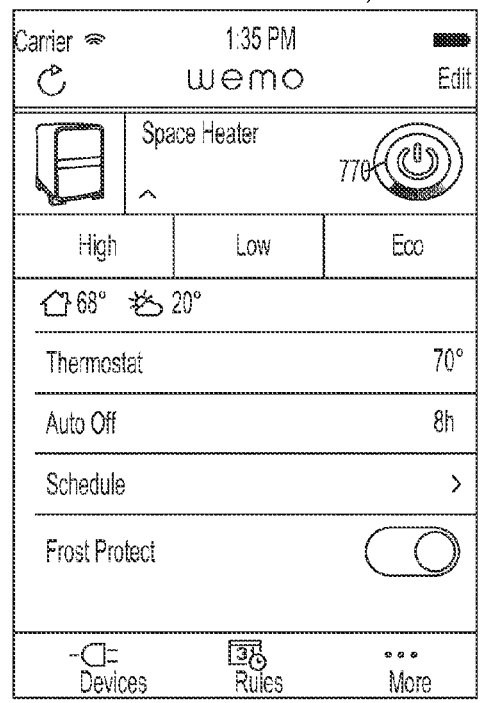
FIG. 7B is a screenshot of an application showing an exemplary display during a transition from an off position to an on position, according to embodiments of the present invention.

FIGS. 7A and 7B illustrate exemplary embodiments of screenshots of an exemplary user interface (UI) display for an application on the mobile device according to embodiments of the present invention. However, the UIs are not limited to these example embodiments. In an embodiment of the invention, the visual interfaces illustrated in FIGS. 7A-7B are displayed on a mobile computing device, which can have a touch sensitive (i.e., touch screen) display device. For ease of explanation, the monitoring and control operations discussed below with reference to FIGS. 7A-7B are described in the context of an application executing on a mobile device 108 with a touch-screen display device. However, the operations are not intended to be limited to the exemplary device shown in FIGS. 7A-7B. It is to be understood that the user interfaces illustrated in the exemplary embodiments of FIGS. 7A-7B can be readily adapted to be rendered on displays of a variety of computing device platforms running a variety of operating systems. Throughout FIGS. 7A-7B, displays are shown with various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. For brevity, only the differences occurring within the figures are described below.

FIG. 7A shows a transition from the exemplary display 700 before a network device is turned on to an exemplary display 710 after the network device is turned on. The left half of FIG. 7A shows, for example, the status of a space heater, and shows that the heater is turned off since the power button 750 is not lit up/bolded. On the other hand, the right half of FIG. 7A shows a second status of the heater and shows that the heater is turned on since the power button 760 is lit up/bolded. The transition between a network device, such as the heater, may include a latency of from close to zero milliseconds up to 1 second or more. If there is a latency greater than zero, the status of the network device on the application may show a transitional status indicator, as shown at the power button 770 in the screenshot 720 of FIG. 7B. As described above, this latency may be reduced if the network devices and/or mobile devices communicate directly with each other as described herein, as it is preferable for the user to experience as little latency as possible during a change in status of a network device.

Figure 8:
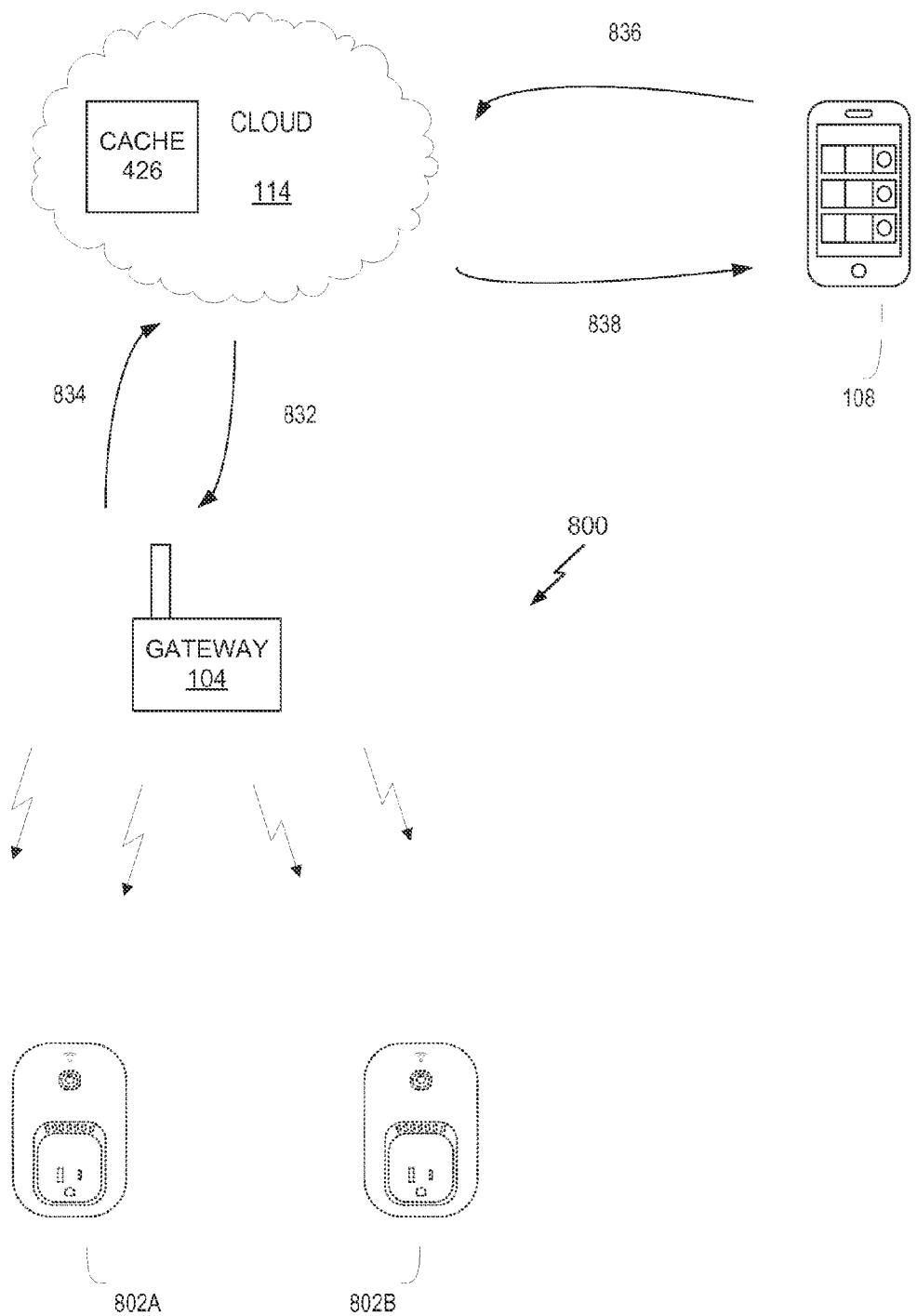
FIG. 8 is a mobile device that is located remotely from a local area network, according to embodiments of the present invention.

FIG. 8 illustrates a mobile device 108 that is located remotely from local area network 800, according to embodiments of the present invention. Local area network 800 includes gateway 104 and network devices 802A and 802B, as shown in FIG. 8. However, local area network 800 may also include a variety of other network devices and one or more mobile devices directly connected to local area network 800. Gateway 104 is connected to cloud network 120, and allows network devices 802 to connect to cloud 120, the internet, or other external networks via gateway 104. In some embodiments, the network devices 302A and 802B may include home automation network devices that allow a user to access, control, and/or configure various home appliances located within the user's home, such as a television, radio, light, microwave, iron, and/or the like.

Mobile device 108 is not directly connected to local area network 800. Instead, mobile device 108 is external to local area network 800 and may connect to cloud network 120 and to local area network 800 via cloud network 120. As noted, network devices 802A and 802B may change status on a periodic basis. In some embodiments, even when external to and not directly connected to local area network 800, a mobile device may request to check the status of the network devices on the network. When mobile device 108 seeks to check the status of any device on the network may send a communication 836 to the cloud network 114, to which all devices on the network are connected either directly or indirectly via gateway 104. Since the cloud network 114 stores an updated table/list of the statuses of each of the network devices within the requesting network's local area network, the cloud network 114 may send a communication 838 of such status data to the mobile device 108. For example, after network devices 802A and 802B are turned on, authenticated and are a part of local area network 800, network devices 802A and 802B may communicate their statuses to cloud network 114. Furthermore, any time the status of network devices 802A and 802B changes, the network device that incurred a status change may push/send information (e.g. an indication) of that status change to cloud network 114. Cloud network 114 may store, in cache 426 or otherwise, the statuses (which may be time stamped in metadata or otherwise) of network devices 802A and 802B. Therefore, when mobile device 108 requests from cloud network 114 the statuses of network devices on local area network 800, cloud 114 may send its most recently stored/updated statuses to mobile device 108.

To obtain the most updated status data of devices within local area network 800, cloud 114 may, upon receiving a request for status data related to network devices 802A and 802B, send a communication 832 (e.g. request, query, etc.) for such status data to network devices 802A and 802B via gateway 104. Once network devices 802A and 802B receive this request, network devices 802A and 802B may send a communication 834 (e.g. updated status data) to cloud 114 to replace the previously stored/cached statuses in cache 426. Upon receipt of updated status data 834 from local area network 800, cloud 114 may send a communication 838 of such status data to the mobile device 108.

However, the process of cloud network 114 requesting updated statuses from network devices 802A and 802B within local area network 800 may cause latency within the system. More specifically, the time required for cloud network 114 to request updated statuses from network devices 802A and 802B and to in turn receive updated statuses from network devices 802A and 802B may be substantially greater than the time required for cloud network 114 to send its currently stored statuses (without being updated) for network devices 802A and 802B to mobile device 108. For example, of the total time required for mobile device 108 to receive updated statuses from cloud network 114, 80% or more of that total time may include cloud network 114 requesting updated statuses from network devices 802A and 802B. On the other hand, of the total time required for mobile device 108 to receive updated statuses from cloud network 114, 20% or more of that total time may include the status data being transmitted from cloud network 114 to mobile device 108. Since a majority of the process required for mobile device 108 to request and receive status data for network devices 802A and 802B is the transmission of data between cloud 114 and network devices 802A and 802B, the mobile device 108 and cloud network 114 may maximize efficiency by minimizing the effect of the transmission of data between cloud 114 and network devices 802A and 802B on the whole process/system. An alternative process to maximize efficiency of the system in this way is shown by flow chart 900 in FIG. 9A.

Figure 9A:
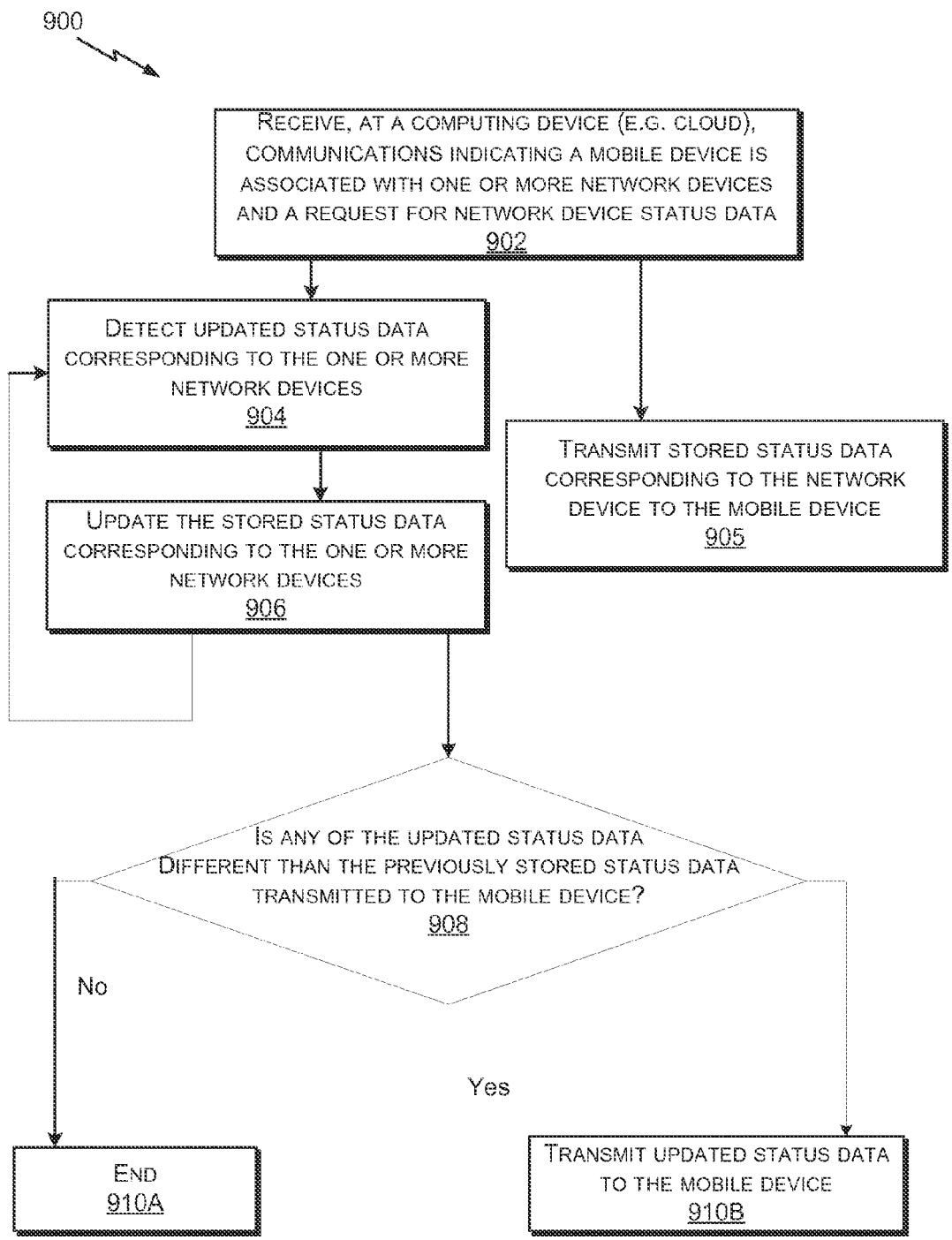
FIG. 9A is a flow chart for a mobile device requesting and receiving updated status data from local area network devices, according to embodiments of the present invention.

FIG. 9A shows a flow chart for a mobile device requesting and receiving updated status data from local area network devices, according to embodiments of the present invention. In step 902, a computing device (e.g. cloud network) may receive communications indicating that a mobile device (e.g. mobile device 108 in FIG. 8) is associated with a local area network (e.g. local area network 800 in FIG. 8) including one or more network devices (e.g. network devices 802A and 802B in FIG. 8). The communications may include a request for network device status data, including status data about network devices within the local area network. After the cloud network receives a communication from a mobile device that the mobile device is associated with one or more network devices within the local area network and a request for status data, the cloud network may transmit the stored status data corresponding to the network device(s) to the mobile device, as shown in step 905. As noted, the majority of the process required for the mobile device to request and receive status data for the network devices is the transmission of data between the cloud and the network devices. Therefore, the mobile device and cloud network may maximize efficiency by having the cloud immediately send any status data currently stored in the cloud to the mobile device. Thereafter, or simultaneous to sending such status data, the cloud may detect updated status data corresponding to the one or more network devices, as shown in step 904.

Figure 9B:
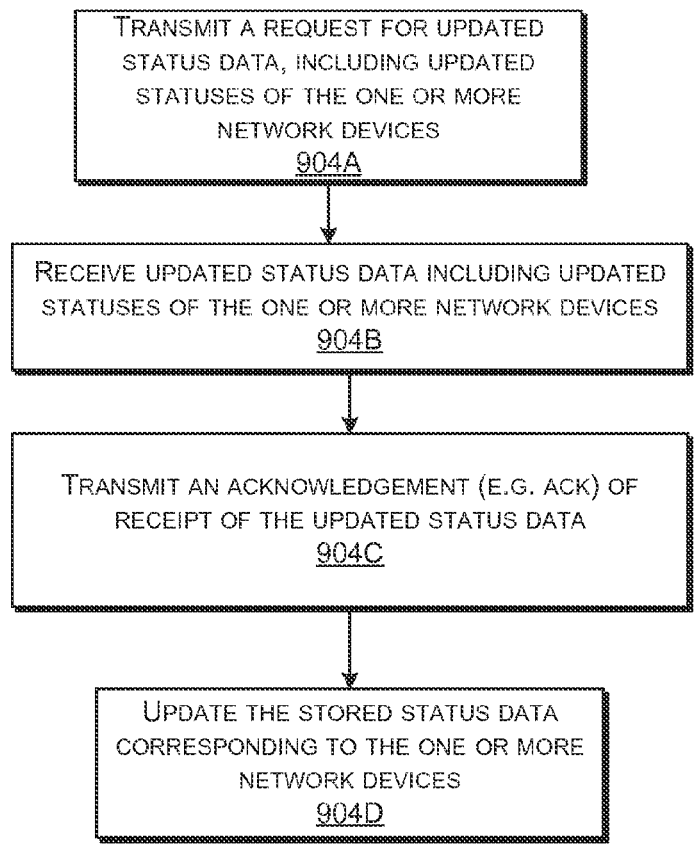
FIG. 9B is a flow chart for a mobile device requesting and receiving updated status data from local area network devices, according to embodiments of the present invention.

One exemplary process for step 904 in FIG. 9A is shown in more detail in FIG. 9B. Furthermore, as shown in FIG. 904A, the cloud network may transmit a request for updated status data, including updated statuses for one or more network devices within the local area network, to the network devices (e.g. via gateway 104). Once the network devices receive such a request, the network devices may send updated status data back to the cloud such that the cloud receives updated status data including updated statuses of the one or more network devices, as shown in step 904B. In step 904C, the cloud network may transmit an acknowledgement (e.g. ACK signal) of receipt of the updated status data to the local area network. In step 904D, the cloud network may update the stored status data corresponding to the one or more network devices in storage (e.g. cache).

Referring back to FIG. 9A, at the same time as or after transmitting the stored status data currently stored in the cloud to the mobile device, and receiving/updating the stored status data corresponding to the one or more network devices, the cloud may compare the updated status data to its previously stored status data to detect any status changes that may have occurred in any network devices within the local area network (step 908). If any network devices have changed in status, the cloud network may transmit updated status data to the mobile device (step 910B). If no changes in status have occurred, the cloud network may do nothing because the mobile device already has updated status data from its previous transmission (step 910A). Since any network devices should update the cloud network any time any network devices incurs a change in status, the cloud network should usually include the most recent status of the network devices. Therefore, step 910A should occur more often than step 910B. However, both steps 910A and 910B are present to confirm that the mobile device has received the most recent status data known by the cloud network.

As shown in process 900 described in FIGS. 9A and 9B, the cloud network may send network status data to the mobile device immediately upon receiving a request from the mobile device for such status data, and only updating its stored status data by requesting such updates from the network to later confirm that the cloud network sent updated/accurate status data to the mobile device. Since the cloud network may/ should consistently contain updated/accurate status data for the network devices, the status data initially sent to the mobile device should be accurate most of the time. It should be understood that although the process in FIGS. 9A and 9B have been described in conjunction with a remote mobile device requesting status data from the cloud, the same process may be used to improve latency of such a request and receipt with another network device or any other device connecting to the local area network via the cloud network from a remote location.

Steps 904 and 906 of process 900 in FIG. 9 may be implemented in a variety of different ways. As noted, the cloud network may send a communication to the local area network including one or more network devices with a request for updated statuses from the network devices, prompting the network devices to send updated statuses back to the cloud network. As a second exemplary embodiment, as discussed with regard to FIG. 5, each network device may share its status with each other network device such that each network device (and mobile device) within the local area network may include a status list/chart in storage (e.g. cache) including the status of each device on the network. Therefore, when the cloud requests an updated status for each of the network devices in the local area network, the cloud must only communicate with one of the network devices to retrieve the updated statuses for each of the network devices. For example, if network devices 802A and 802B in FIG. 8 each include updated statuses for each other and any other network devices within the local area network, cloud 114 must only request updated status data for each network device from either network device 802A or 802B, but not from each of the network devices. The process of requesting updated status data from only one network device instead of each network device may cause the latency for updating the status data on the cloud network to be significantly reduced.

As a third exemplary embodiment, the cloud network may periodically check for updated statuses from the network devices (e.g. once every 5 millisecond, 10 millisecond, 30 millisecond, 1 second, etc.). In other words, the cloud network may check for updated statuses from the network devices (e.g. either from a single network device that has updated statuses for each network device or from all network devices) on a periodic basis no matter how often the statuses of the network devices are changing. As a fourth exemplary embodiment, the network devices may periodically/continuously push/send their current statuses to the cloud whether or not their statuses have changed. As a fifth exemplary embodiment, a mobile device connecting to the local area network for the first time, such as mobile device 108 described with respect to FIG. 8, may directly communicate with each network device that it knows of individually (instead of, for example, broadcasting a request for updated statuses across the whole network). On the other hand, as a sixth exemplary embodiment, each network device may continuously scan/ look for any new mobile or other devices that attempt to communicate with the local area network and/or are remotely connected to the network. For example, a network device may have a stored list of the mac or other addresses/identifications for a set of known devices that may attempt to connect with the network at any time. Similarly, a network device or mobile device may subscribe to an In App Push (IAP) Notification service, where each device subscribes to each other device that it desires to subscribe to. As noted, there are a variety of different processes for the cloud network requesting updated status information from the network devices in the local area network. However, such a request may occur after the cloud network sends its currently (e.g. most recently) stored status information to the mobile device so as to significantly reduce the latency before the mobile device receives such status data after it requests it.

Figure 10A:
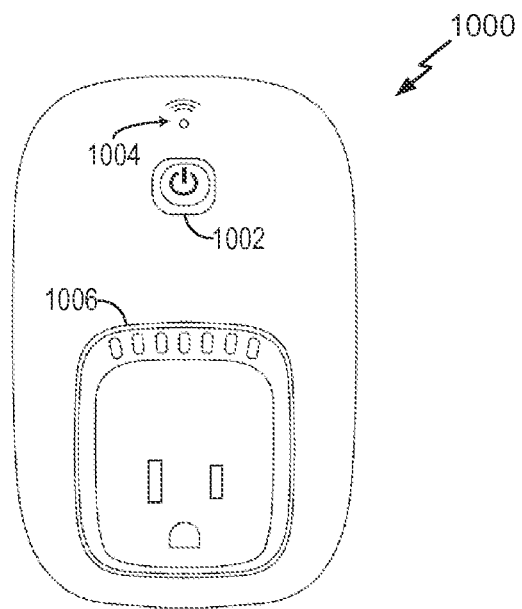
FIG. 10A is an illustration of an example of a front view of a network device in accordance with an embodiment.
Figure 10B:
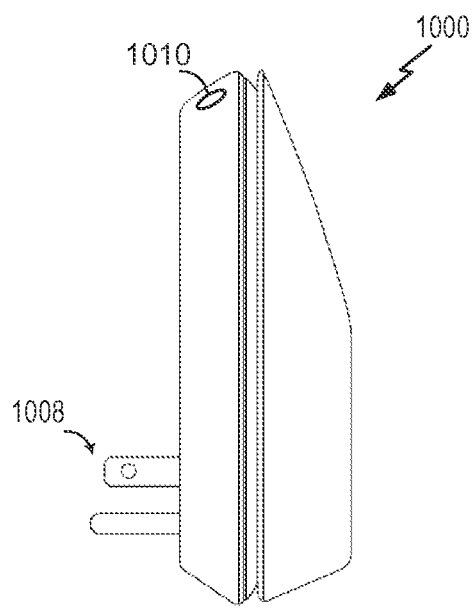
FIG. 10B is an illustration of an example of a side view of a network device in accordance with an embodiment.

FIG. 10A illustrates an example of a front view of a network device 1000 and FIG. 10B illustrates an example of a side view of the network device 1000. The network device may include any of the network devices described herein. In some embodiments, the network device 1000 may be a home automation network device. For example, the network device 1000 may include a home automation switch that may be coupled with a home appliance. A user may wirelessly access the network device 1000 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1000 may include a WiFi enabled switch that connects home appliances and other electronic devices to a compatible 802.11b/g/n WiFi network. The network device 1000 may thus allow users to locally or remotely turn devices on or off from anywhere, program customized notifications, and/or change device status. The network device 1000 may further allow a user to create custom schedules or have devices respond to sunrise or sunset.

The network device 1000 includes a power switch 602 that may be depressed in order to turn the network device 1000 on and off. In some embodiments, a light source may be integrated with or located behind the power switch. For example, a light-emitting diode (LED) may be located on a circuit board under the power button 1002. The light source may be illuminated when the network device 1000 is powered on, and may not be illuminated when the network device 1000 is powered off.

The network device 1000 further includes a communications signal indicator 1004. The signal indicator 1004 may indicate whether the network device 1000 has access to a communications signal, such as a WiFi signal. For example, the signal indicator 604 may include a light source (e.g., a LED) that illuminates when the network device 1000 is connected to a communications signal. The light source may depict different colors or other characteristics (e.g., flashing, dimming, or the like) to indicate different levels of signal strength or mode of operation.

The network device 1000 includes a restore button 1010. The restore button 1010 may allow a user to reset the network device 1000 to factory default settings. For example, upon being depressed, the restore button 1010 may cause all software on the device to be reset to the settings that the network device 1000 included when purchased from the manufacturer.

The network device 1000 further includes a plug 1008 and an outlet 1006. The plug 1008 allows the network device 1000 to be plugged into a wall socket, such as a socket providing 120V, 220V, or the like. In turn, an appliance may be plugged into the outlet 1006. Once the network device 1000 is registered according to the techniques described above, an appliance plugged into the socket 1006 may be controlled by a user using a mobile device (e.g., mobile device 108).

Figure 11:
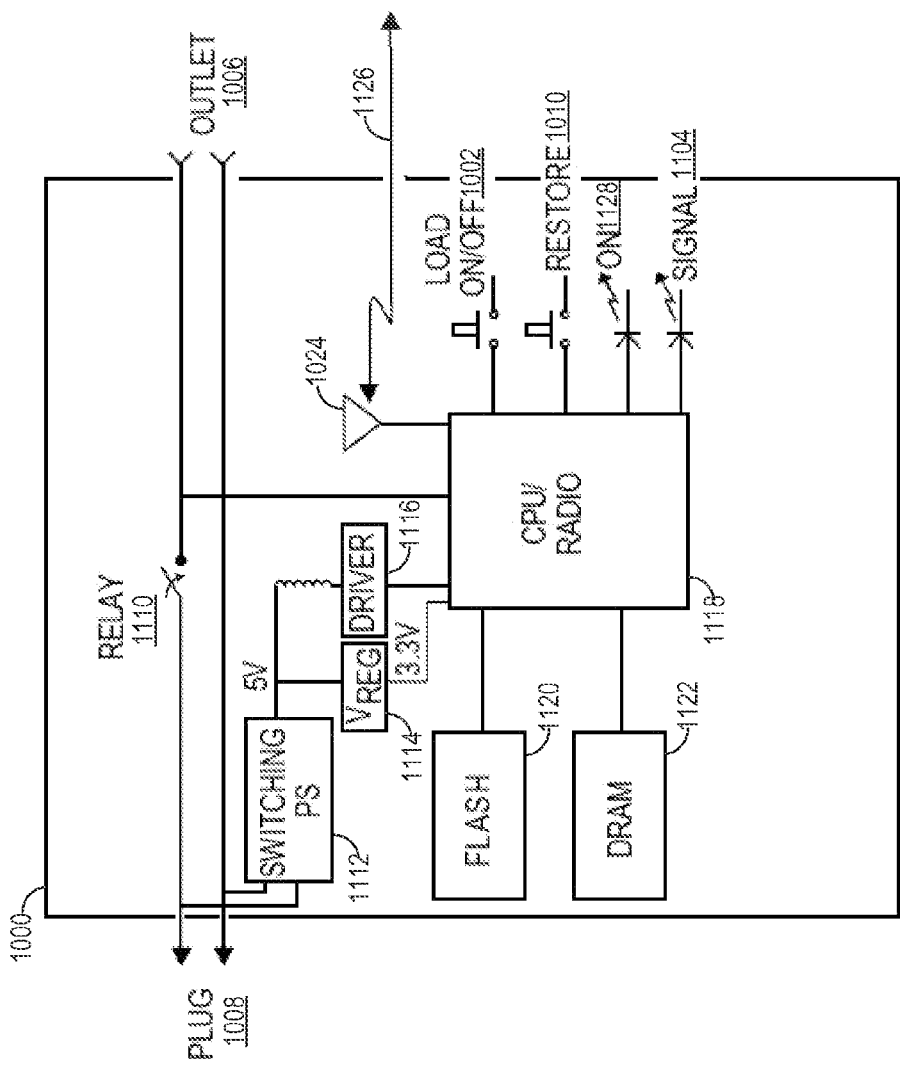
FIG. 11 is an example of a block diagram of a network device, in accordance with an embodiment.

FIG. 11 is an example of a block diagram of the network device 1000 depicting different hardware and/or software components of the network device 1000. As described above with respect to FIG. 10, the network device 1000 includes the outlet 1006, the plug 1008, the power button 1002, the restore button 1010, and the communications signal indicator 1004.

The network device 1000 also includes light source 1128 associated with the power button 1002. As previously described, the light source 1128 may be illuminated when the network device 1000 is powered on.

The network device 1000 further includes a relay 1110. The relay 1110 is a switch that controls whether power is relayed from the plug 1008 to the outlet 1006. The relay 1110 may be controlled either manually using the power button 1002 or remotes using wireless communication signals. For example, when the power button 1002 is in an ON position, the relay 1110 may be closed so that power is relayed from the plug 1008 to the outlet 1006. When the power button 1002 is in an OFF position, the relay 1110 may be opened so that current is unable to flow from the plug 1008 to the outlet 1006. As another example, an application or program running on a mobile device may transmit a signal that causes the relay 1110 to be opened or closed. For instance, a mobile application may display a graphical interface on the mobile device that includes a power button. The user may tap or otherwise select the power button, and the mobile application may send a communication signal (e.g., over a WiFi network) to the network device 1000 instructing the network device 1000 to open or close the relay 1110.

The network device 1000 further includes flash memory 1120 and dynamic random access memory (DRAM) 1122. The flash memory 1120 may be used to store instructions or code relating to an operating system, one or more applications, and any firmware. The flash memory 1120 may include nonvolatile memory so that any firmware or other program can be can updated. In the event the network device 1000 loses power, information stored in the flash memory 1120 may be retained. The DRAM 1122 may store various other types of information needed to run the network device 1000, such as all runtime instructions or code.

The network device 1000 further includes a CPU/Radio 1118. The CPU/Radio 1118 controls the operations of the network device 1000. For example, the CPU/Radio 1118 may execute various applications or programs stored in the flash memory 1120 and/or the dynamic random access memory (DRAM) 1122. The CPU/Radio 1118 may also receive input from the various hardware and software components, interpret the input, and perform one or more functions in response to the input. As one example, the CPU/Radio 1118 may determine whether the power button 1002 has been pressed, and determines whether the relay 1110 needs to be opened or closed. The CPU/Radio 1118 may further perform all communications functions in order to allow the network device 1000 to communicate with other network devices, one or more gateways, a cloud network, and/or one or more mobile devices. The network device 1000 may communicate with other devices and/or networks via antenna 1124. For example, antenna 1124 may include a 2.4 GHz antenna that can transmit and receive WiFi communications signals. The antenna 1124 may include other types of antennas that can communicate Bluetooth® signals, Zigbee® signals, Ultra-Wideband (UWB) signals, and/or the like. In some embodiments, the network device 1000 may include multiple antennas for communicating different types of communication signals.

The network device 1000 further includes a driver 1116, a switching power supply 1112, and a voltage regulator 1114. The driver 1116 may include instructions or code that can be used to translate control signals or commands received from applications running on the DRAM 1122 to commands that the various hardware components in the network device 1000 can understand. In some embodiments, the driver 1116 may include an ambient application running on the DRAM 1122.

The switching power supply 1112 may be used to transfer power from the outlet in which the plug 1008 is connected to the various loads of the network device 1000 (e.g., CPU/Radio 718). The switching power supply 1112 may efficiently convert the voltage and current characteristics of the electrical power to a level that is appropriate for the components of the network device 1000. For example, the switching power supply 1112 may perform AC-DC conversion. In some embodiments, the switching power supply 1112 may be used to control the power that is relayed from the plug 1008 to the outlet 1006. The voltage regulator 1114 may be used to convert the voltage output from the switching power supply 1112 to a lower voltage usable by the CPU/Radio 1118. For example, the voltage regulator 1114 may regulate the DC voltage from 5V to 3.3V.

In various embodiments, functions may be stored as one or more instructions or code in memory, such as the flash memory 1120 and/or the DRAM 722. The network device 1000 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2-3, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2-3. The memory, such as the flash memory 1120 and/or the DRAM 1122, may be a processor-readable memory and/or a computer-readable memory that stores software code (programming code, instructions, etc.) configured to cause a processor(s) within the CPU/Radio 1118 to perform the functions described. In other embodiments, one or more of the functions described may be performed in hardware.

A set of these instructions and/or code might be stored on a computer-readable storage medium, such as the flash memory 1120 and/or the DRAM 1122. In some cases, the storage medium might be incorporated within a computer system, such as the CPU/Radio 1118. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1000 and/or might take the form of source and/or installable code, which, upon compilation and/or installation on the network device 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

It should be appreciated that the network device 1000 may have other components than those depicted in FIGS. 10 and 11. Further, the embodiment shown in the figures are only one example of a network device that may incorporate an embodiment of the invention. In some other embodiments, network device 1000 may have more or fewer components than shown in the figure, may combine two or more components, or may have a different configuration or arrangement of components.

Figure 12:
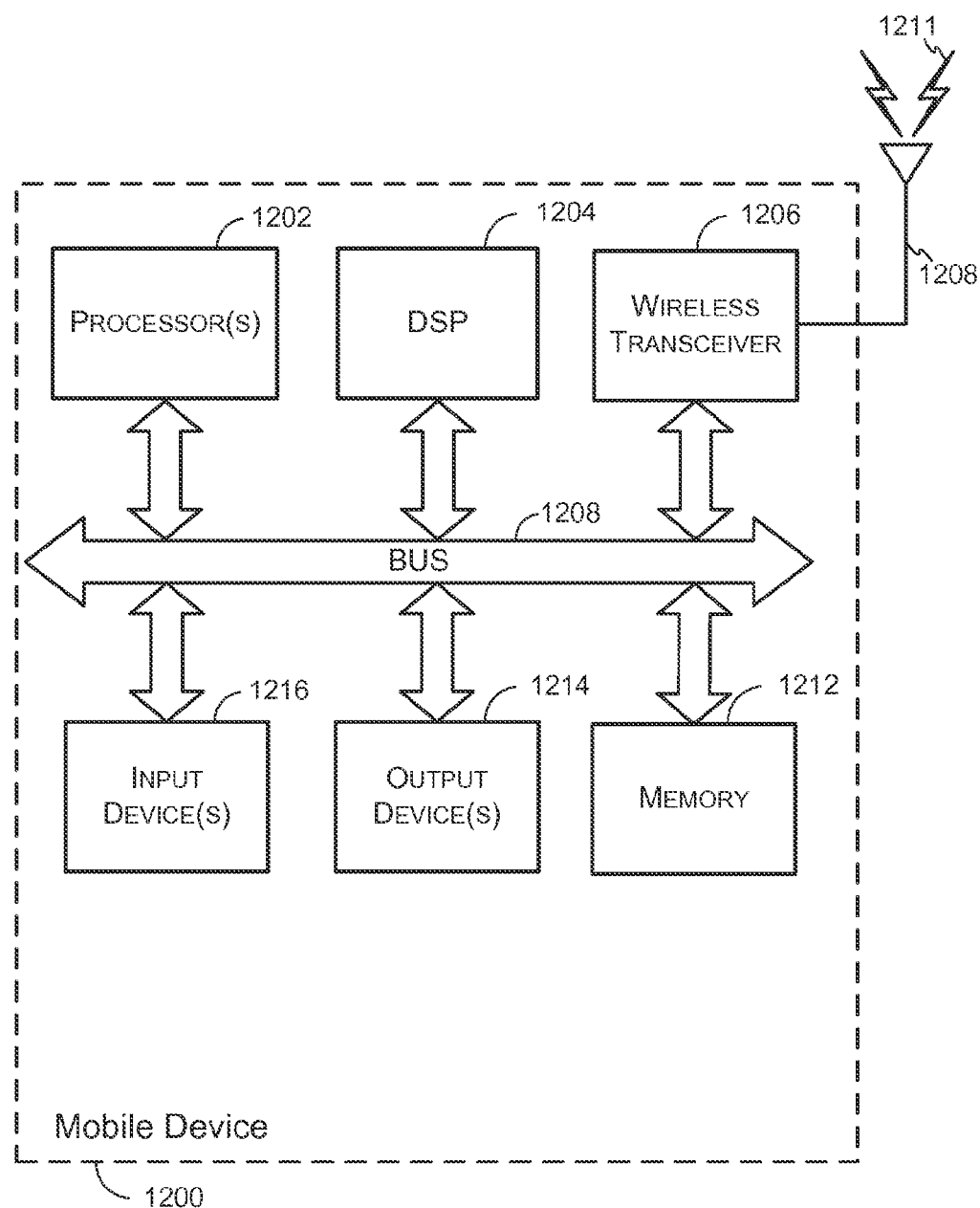
FIG. 12 is a block diagram illustrating an example of a mobile device, in accordance with some embodiments.

FIG. 12 illustrates an example of a mobile device 1200. The mobile device 1200 may be a cellular telephone, a smartphone, a laptop computer, a tablet, a personal digital assistant (PDA), a computing device, or any other mobile device having wireless connection capability. The mobile device 1200 includes hardware elements that can be electrically coupled via a bus 1218 (or may otherwise be in communication, as appropriate). In one embodiment, the bus 1218 can be used for the processor(s) 1202 to communicate between cores and/or with the memory 1212. The hardware elements may include one or more processors 1202, including without limitation one or more general-purpose processors and/or one or more special-purpose processors (such as digital signal processing chips, graphics acceleration processors, and/or the like); one or more input devices 1216, which can include without limitation a camera, a mouse, a keyboard, a touch sensitive screen, a touch pad, a keypad, and/or the like; and one or more output devices 1214, which can include, without limitation, a display, a printer, and/or the like.

The mobile device 1200 may include one or more wireless transceivers 1206 connected to the bus 1218. The wireless transceiver 1206 may be operable to receive a wireless signal 1210 via antenna 1208. The wireless signal 1210 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1206 may be configured to receive various radio frequency (RF) signals 1210 via antenna 1208 from one or more gateways, network devices, cloud networks, and/or the like. Mobile device 1200 may also be configured to decode and/or decrypt, via the DSP 804 and/or processor(s) 1202, various signals received from one or more gateways, network devices, cloud networks, and/or the like.

The mobile device 1200 may further include (and/or be in communication with) one or more non-transitory storage devices (e.g., memory 1212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more instructions or code in memory 1212, such as on a computer-readable storage medium, such as RAM, ROM, FLASH, or disc drive, and executed by processor(s) 1202 or DSP 1204. The mobile device 1200 can also comprise software elements (e.g., located within the memory 1212), including, for example, an operating system, device drivers, executable libraries, and/or other code, such as one or more application programs, which may comprise computer programs implementing various functions Memory 1212 may be a processor-readable memory and/or a computer-readable memory that stores software code (programming code, instructions, etc.) configured to cause the processor(s) 1202 and/or DSP 1204 to perform the various functions. In other embodiments, the various functions described may be performed in hardware.

Figure 13:
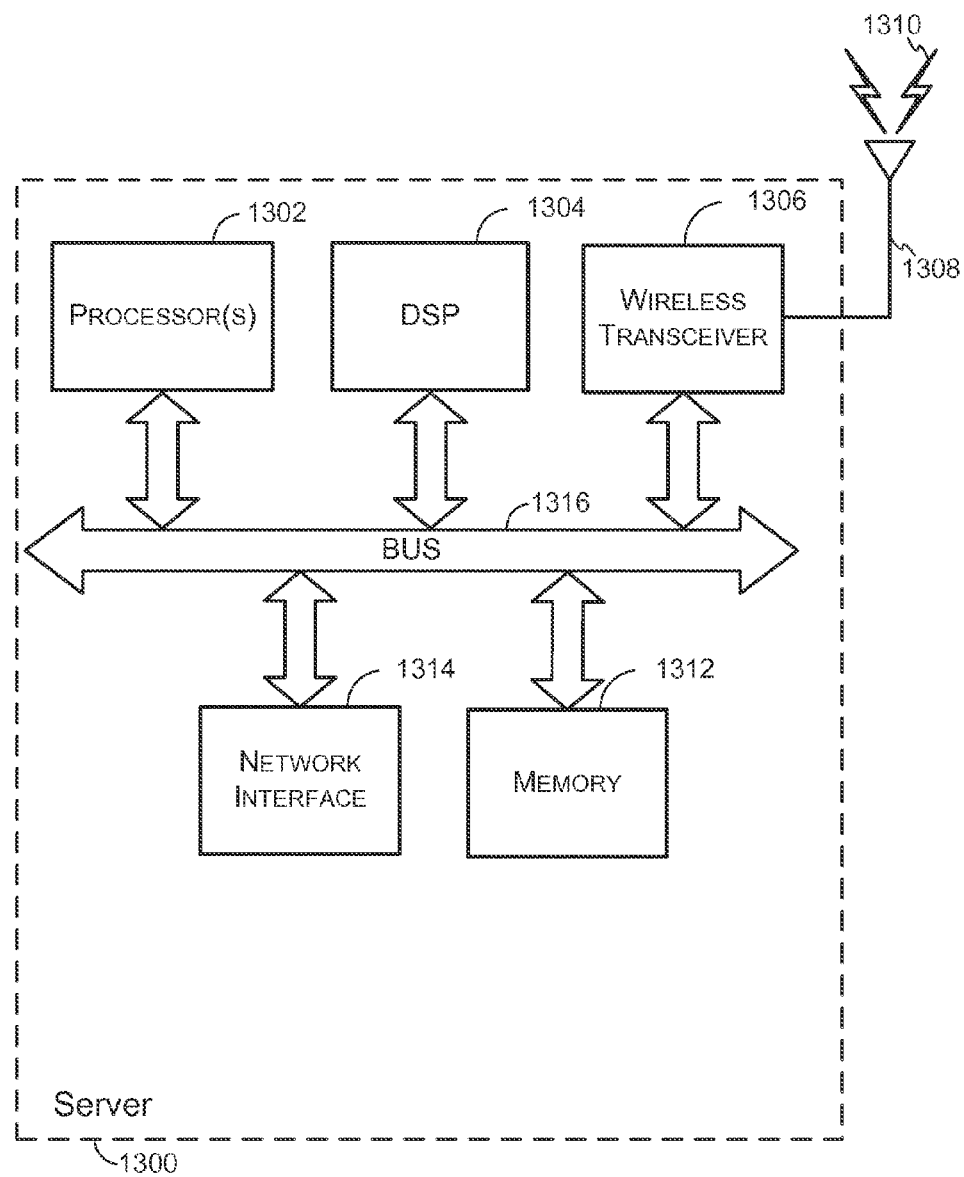
FIG. 13 is a block diagram illustrating an example of a server, in accordance with some embodiments.

FIG. 13 illustrates an example of a server 1300. The server 1300 includes hardware elements that can be electrically coupled via a bus 1316 (or may otherwise be in communication, as appropriate). In one embodiment, the bus 1316 can be used for the processor(s) 1302 to communicate between cores and/or with the memory 1312. The hardware elements may include one or more processors 1302, including without limitation one or more general-purpose processors and/or one or more special-purpose processors (such as digital signal processing chips, graphics acceleration processors, and/or the like), memory 1312, DSP 1304, a wireless transceiver 1306, a bus 1316, and antenna 1308. Furthermore, in addition to the wireless transceiver 1306, server 1300 can further include a network interface 1314 to communicate with a network (e.g., a local area network, a network of a preferred carrier, Internet, etc.).

The server 1300 may further include (and/or be in communication with) one or more non-transitory storage devices (e.g., memory 1312), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more instructions or code in memory 1312. The server 1300 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 6 and 9A, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 6 and 9A. The memory 1312 may be a processor-readable memory and/or a computer-readable memory that stores software code (programming code, instructions, etc.) configured to cause the processor(s) 1302 to perform the functions described. In other embodiments, one or more of the functions described may be performed in hardware.

A set of these instructions and/or code might be stored on a computer-readable storage medium, such as the memory 1312. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the server 1300 and/or might take the form of source and/or installable code, which, upon compilation and/or installation on the server 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
receiving, at a network device on a network, a communication including an indication that a new network device is associated with the network;
transmitting stored status data, wherein the stored status data includes a status corresponding to the network device;
receiving a query including a request to subscribe to the network device;
generating and storing subscription data in a storage device, wherein generating and storing the subscription data includes using the received request to subscribe the new network device to the network device, and wherein the subscription data includes information associated with a subscription between the network device and the new network device;

transmitting updated status data based on the subscription to the network device, wherein the updated status data includes an updated status corresponding to the network device;

transmitting a new device query including a request to subscribe to the new network device; and receiving new network device status data, wherein the new network device status data includes a status corresponding to the new network device.

2. The method of claim 1, wherein the stored status data and the new network device status data are stored in a cache.

3. The method of claim 1, further comprising:
transmitting identification information corresponding to the network device.

4. The method of claim 3, wherein the updated status data and identification information are transmitted simultaneously.

5. The method of claim 1, further comprising:
receiving identification information corresponding to the new network device;
storing the identification information corresponding to the new network device; and
associating the identification information corresponding to the new network device with the subscription.

6. The method of claim 1, wherein the subscription expires after a predetermined amount of time.

7. The method of claim 6, further comprising:
receiving a second query including a request to re-subscribe to the network device.

8. The method of claim 1, further comprising:
receiving a communication including an acknowledgement of the request to subscribe to the new network device.

9. The method of claim 1, wherein the stored status data includes a timestamp, and wherein the updated status data includes an updated timestamp.

10. The method of claim 1, further comprising:
transmitting a set of network credentials to the new network device so as to allow the new network device to join the network.

11. A computing device, comprising:
one or more processors; and
a memory having instructions stored thereon that, when executed by the one or more processors, cause the computing device to perform operations including:
receiving, at a network device on a network, a communication including
an indication that a new network device is associated with the network;
transmitting stored status data, wherein the stored status data includes a status corresponding to the network device;
receiving a query including a request to subscribe to the network device;
generating and storing subscription data in a storage device, wherein generating and storing the subscription data includes using the received request to subscribe the new network device to the network device, and wherein the subscription data includes information associated with a subscription between the network device and the new network device;
transmitting updated status data based on the subscription to the network device, wherein the updated status data includes an updated status corresponding to the network device;
transmitting a new device query including a request to subscribe to the new network device; and
receiving new network device status data, wherein the new network device status data includes a status corresponding to the new network device.

12. The computing device of claim 11, wherein the stored status data and the new network device status data are stored in a cache.

13. The computing device of claim 11, further comprising instructions that, when executed by the one or more processors, cause the computing device to perform operations including:
transmitting identification information corresponding to the network device.

14. The computing device of claim 13, wherein the updated status data and identification information are transmitted simultaneously.

15. The computing device of claim 11, further comprising instructions that, when executed by the one or more processors, cause the computing device to perform operations including:
receiving identification information corresponding to the new network device;
storing the identification information corresponding to the new network device; and
associating the identification information corresponding to the new network device with the subscription.

16. The computing device of claim 11, wherein the subscription expires after a predetermined amount of time.

17. The computing device of claim 16, further comprising instructions that, when executed by the one or more processors, cause the computing device to perform operations including:
receiving a second query including a request to re-subscribe to the network device.

18. The computing device of claim 11, further comprising instructions that, when executed by the one or more processors, cause the computing device to perform operations including:
receiving a communication including an acknowledgement of the request to subscribe to the new network device.

19. The computing device of claim 11, wherein the stored status data includes a timestamp, and wherein the updated status data includes an updated timestamp.

20. The computing device of claim 11, further comprising instructions that, when executed by the one or more processors, cause the computing device to perform operations including:
transmitting a set of network credentials to the new network device so as to allow the new network device to join the network.

21. A computer-program product tangibly embodied in a non-transitory machine-readable storage medium, including instructions configured to cause a data processing apparatus to:
receive, at a network device on a network, a communication including an indication that a new network device is associated with the network;
transmit stored status data, wherein the stored status data includes a status corresponding to the network device;
receive a query including a request to subscribe to the network device;
generate and store subscription data in a storage device, wherein generating and storing the subscription data includes using the received request to subscribe the new network device to the network device, and wherein the subscription data includes information associated with a subscription between the network device and the new network device;

transmit updated status data based on the subscription to the network device, wherein the updated status data includes an updated status corresponding to the network device;

transmit a new device query including a request to subscribe to the new network device; and receive new network device status data, wherein the new network device status data includes a status corresponding to the new network device.

22. The computer-program product of claim 21, wherein the stored status data and the new network device status data are stored in a cache.

23. The computer-program product of claim 21, further comprising instructions configured to cause the data processing apparatus to:

transmit identification information corresponding to the network device.

24. The computer-program product of claim 23, wherein the updated status data and identification information are transmitted simultaneously.

25. The computer-program product of claim 21, further comprising instructions configured to cause the data processing apparatus to:

receive identification information corresponding to the new network device;

store the identification information corresponding to the new network device; and associate the identification information corresponding to the new network device with the subscription.

26. The computer-program product of claim 21, wherein the subscription expires after a predetermined amount of time.

27. The computer-program product of claim 26, further comprising instructions configured to cause the data processing apparatus to:

receive a second query including a request to re-subscribe to the network device.

28. The computer-program product of claim 21, further comprising instructions configured to cause the data processing apparatus to:

receive a communication including an acknowledgement of the request to subscribe to the new network device.

29. The computer-program product of claim 21, wherein the stored status data includes a timestamp, and wherein the updated status data includes an updated timestamp.

30. The computer-program product of claim 21, further comprising instructions configured to cause the data processing apparatus to:

transmit a set of network credentials to the new network device so as to allow the new network device to join the network.

* * * * *